United States Patent
Nishiguchi et al.

(10) Patent No.: US 8,293,820 B2
(45) Date of Patent: Oct. 23, 2012

(54) CATIONIC ELECTRODEPOSITION COATING COMPOSITION AND ARTICLES COATED WITH THE ELECTRODEPOSITION COATING

(75) Inventors: Shigeo Nishiguchi, Hiratsuka (JP); Hideki Iijima, Hiratsuka (JP); Naoyuki Yoshikawa, Hiratsuka (JP); Kiyoshi Kato, Hiratsuka (JP); Yukihiro Nemoto, Hiratsuka (JP); Reijirou Nishida, Hiratsuka (JP)

(73) Assignee: Kansai Paint Co., Ltd., Amagasaki-shi (JP)

( * ) Notice: Subject to any disclaimer, the term of this patent is extended or adjusted under 35 U.S.C. 154(b) by 1375 days.

(21) Appl. No.: 11/875,800

(22) Filed: Oct. 19, 2007

(65) Prior Publication Data
US 2008/0099342 A1    May 1, 2008

(30) Foreign Application Priority Data

Oct. 31, 2006  (JP) ................................ 2006-295914
May 21, 2007  (JP) ................................ 2007-134275

(51) Int. Cl.
*C08L 63/02*  (2006.01)
(52) U.S. Cl. ...................................... 523/415; 523/404
(58) Field of Classification Search ............... 523/415, 523/404
See application file for complete search history.

(56) References Cited

U.S. PATENT DOCUMENTS

| 5,594,049 A | 1/1997 | Yamada et al. |
| 6,734,260 B2 * | 5/2004 | Nishiguchi et al. ........... 525/405 |
| 2001/0008692 A1 | 7/2001 | Shirakawa et al. |

FOREIGN PATENT DOCUMENTS

| CN | 1699484 A | 11/2005 |
| JP | 62-086060 | 4/1987 |
| JP | 03-177412 | 8/1991 |
| JP | 06-025383 | 2/1994 |
| JP | 7-233238 | 9/1995 |
| JP | 2000-273138 | 10/2000 |
| JP | 2001-192611 | 7/2001 |
| JP | 2002-241690 | 8/2002 |
| JP | 2003-206440 | 7/2003 |
| JP | 2003-221547 | 8/2003 |

OTHER PUBLICATIONS

Patent Abstracts of Japan, Publication No. 2002-241690; Date of Publication: Aug. 28, 2002; in the name of Jiro Nishiguchi et al.
Office action issued in corresponding Chinese Patent Application No. 200710165910.5 dated Aug. 31, 2011, 9pp.

* cited by examiner

*Primary Examiner* — Kishor Mayekar
(74) *Attorney, Agent, or Firm* — Christie, Parker & Hale, LLP

(57) ABSTRACT

A cationic electrodeposition coating composition comprising a cationic resin (A) and a blocked polyisocyanate (B) obtained by reaction between a polyisocyanate compound (b1) with two or more isocyanate groups, castor oil (b2) and a blocking agent (b3). The cationic electrodeposition coating composition has excellent throwing power, suitability for electrodeposition onto hot dip galvanized steel sheets, finished appearance and corrosion resistance.

6 Claims, 1 Drawing Sheet

CATIONIC ELECTRODEPOSITION COATING COMPOSITION AND ARTICLES COATED WITH THE ELECTRODEPOSITION COATING

CROSS-REFERENCE TO RELATED APPLICATION

This application claims priority to and the benefit of Japanese Patent Application Nos. 2006-295914 filed Oct. 31, 2006, and 2007-134275 filed May 21, 2007.

BACKGROUND OF THE INVENTION

1. Field of the Invention

The present invention relates to a cationic electrodeposition coating composition with excellent throwing power, suitability for electrodeposition onto hot dip galvanized steel sheets, finished appearance and corrosion resistance.

2. Description of the Related Art

As conventional cationic coating compositions containing blocked polyisocyanates there may be mentioned cationic electrodeposition coating compositions comprising base resins with cationic groups such as amino, ammonium, phosphonium and sulfonium or such cationic groups that have been neutralized, and blocked polyisocyanates as crosslinking agents (curing agents).

Examples of blocking agents used for blocked polyisocyanate compounds for cationic electrodeposition coatings include alcohol-based, ether alcohol-based and oxime-based blocking agents, which are used to take advantage of their coated film corrosion resistance and coating stability.

One conventional blocked polyisocyanate that has been disclosed has an aromatic isocyanurate ring and three or more blocked isocyanate groups, with at least one of the blocked isocyanate groups being blocked by a glycol ether (Japanese Unexamined Patent Publication No. 7-233238).

There has also been disclosed an invention which is a cationic electrodeposition coating composition comprising a block isocyanate curing agent and an epoxy-modified base resin with a cationic group, where the blocking agent for the block isocyanate curing agent employs a propyleneglycol monoalkyl ether (Japanese Unexamined Patent Publication No. 2001-192611).

There has further been disclosed a cationic coating composition containing a cationic resin (A) and a blocked polyisocyanate wherein a polyisocyanate compound is blocked with a blocking agent comprising a diol component with a molecular weight of 76-150 having two hydroxyl groups with different reactivities (Japanese Unexamined Patent Publication No. 2002-241690).

However, when high voltage is applied to the blocked polyisocyanate-containing cationic coating compositions disclosed in the aforementioned patent documents in order to achieve high throwing power, the result is an insufficiency in either the inhibition of pinhole generation on hot dip galvanized steel sheets or in the finished appearance or corrosion resistance.

BRIEF SUMMARY OF THE INVENTION

It is an object of the invention to provide a cationic electrodeposition coating composition with excellent throwing power, suitability for electrodeposition onto hot dip galvanized steel sheets, finished appearance and corrosion resistance.

As a result of diligent research directed toward solving the problems described above, the present inventors have discovered a cationic electrodeposition coating composition comprising a cationic resin (A) and a blocked polyisocyanate (B) obtained by reaction between a polyisocyanate compound (b1) with two or more isocyanate groups, castor oil (b2) and a blocking agent (b3), and the invention has been completed on the basis of this discovery.

The cationic electrodeposition coating composition of the invention can yield coated articles with excellent throwing power, suitability for electrodeposition onto hot dip galvanized steel sheets, finished appearance and corrosion resistance.

The castor oil (b2) component in the blocked polyisocyanate (B) used for the cationic electrodeposition coating hastens initial deposition of the electrodeposited coated film to improve fused bonding of the coated film and adhesiveness onto articles to be coated.

Specifically, since hastening of the initial deposition of the electrodeposition coated film and satisfactory fused bonding of the coated film permit application of a high voltage, the "throwing power" is improved. Furthermore, as a result of satisfactory fused bonding of the coated film and adhesiveness onto articles to be coated, it is possible to form a strong deposited film that can withstand sparks generated during electrodeposition of the hot dip galvanized steel sheet, and excellent "suitability for electrodeposition of hot dip galvanized steel sheets", so that coated articles with satisfactory finished appearance and corrosion resistance can be obtained.

Figure 1:
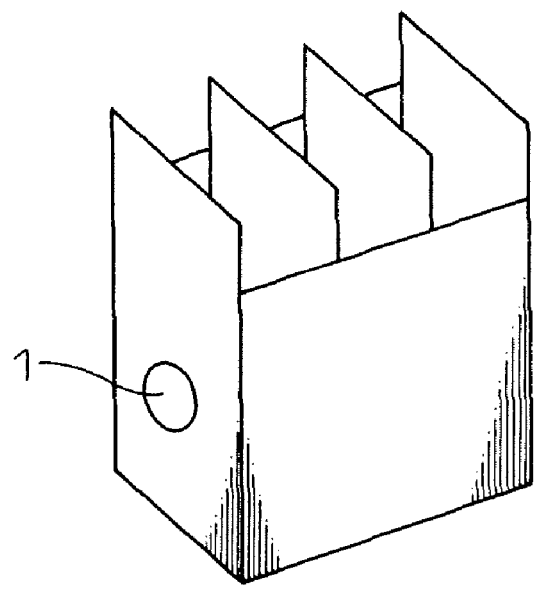
FIG. 1 is a model diagram of a "four sheets box throwing power test jig" used for a throwing power test.

"1" represents an 8 mm diameter hole, "2" represents the outer sheet of a four sheets box throwing power test jig (A-surface), "3" represents the inner sheet of a four sheets box throwing power test jig (G-surface), and "4" represents an electrodeposition coating bath.

DETAILED DESCRIPTION OF THE INVENTION

Preferred embodiments of the invention will now be explained in detail, with the understanding that there is no limitation only to these embodiments, and various modifications may be implemented as are within the spirit and scope of the invention.

The cationic electrodeposition coating composition of the invention comprises a cationic resin (A) and a blocked polyisocyanate (B) obtained by reacting a polyisocyanate compound (b1) having two or more isocyanate groups with castor oil (b2) and a blocking agent (b3). Each of the components will now be explained in detail.

[Cationic Resin (A)]

The cationic resin (A) is a resin having a cationizable group such as an amino, ammonium salt, sulfonium salt or phosphonium salt group in the molecule, and as such resins there may be mentioned those ordinarily used as base resins for electrodeposition coatings, such as epoxy resins, acrylic resins, polybutadiene resins, alkyd resins and polyester resins. Particularly suitable from the standpoint of both corrosion resistance and suitability for electrodeposition onto hot dip galvanized steel sheets are amine-added epoxy resins obtained by addition reaction of an amino group-containing compound with an epoxy resin.

As examples of amine-added epoxy resins there may be mentioned:

(1) Resins obtained by addition of primary mono- and polyamines, secondary mono- and polyamines or primary and secondary mixed polyamines to epoxy resins (for example, see U.S. Pat. No. 3,984,299);

(2) Resins obtained by addition of secondary mono- and polyamines with ketiminated primary amino groups to epoxy resins (for example, see U.S. Pat. No. 4,017,438); and (3) Reaction products obtained by etherification of epoxy resins with hydroxy compounds containing ketiminated primary amino groups (for example, see Japanese Unexamined Patent Publication No. 59-43013).

The epoxy resin used for production of an amine-added epoxy resin is a compound with at least one and preferably two or more epoxy groups in the molecule, and suitable ones are those with a number-average molecular weight in the range of generally at least 200, preferably 400-4,000 and more preferably 800-2,500 and epoxy equivalents in the range of at least 160, preferably 180-2,500 and more preferably 400-1,500, among which those obtained by reaction between polyphenol compounds and epihalohydrins are preferred.

Here, the "number-average molecular weight" is the value of the number-average molecular weight measured by GPC in a tetrahydrofuran eluent at a flow rate of 1.0 ml/min and a measuring temperature of 40° C. according to the method of JIS K 0124-83, and expressed based on the number-average molecular weight of polystyrene. The GPC apparatus used was a "HLC8120GPC" (trade name of Tosoh Corp.) comprising four separating columns: "TSK GEL4000HXL", "TSK G3000HXL", "TSK G2500HXL" and "TSK G2000HXL" (all by Tosoh Corp.).

As examples of polyphenol compounds used to form the epoxy resin there may be mentioned bis(4-hydroxyphenyl)-2,2-propane[bisphenol A], bis(4-hydroxyphenyl)methane [bisphenol F], bis(4-hydroxycyclohexyl)methane[hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-2-tert-butyl-phenyl)-2,2-propane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol-novolac and cresol-novolac.

Preferred in the epoxy resin obtained by reaction between the polyphenol compound and epichlorhydrin, are resins having the following formula, derived from bisphenol A:

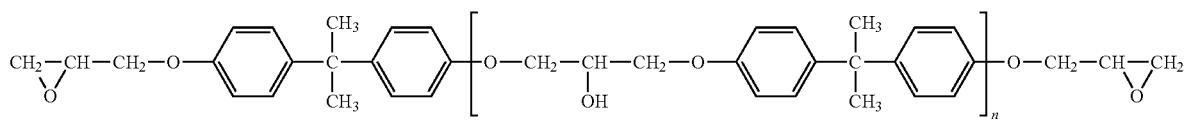

(wherein n is an integer of 0 or greater and preferably 0-8).

As examples of commercially available epoxy resins there may be mentioned several marketed by Japan Epoxy Resins Co., Ltd. under the names EPICOAT 828EL, 1002, 1004 and 1007 (trade names).

The epoxy resin used may be the product of partial reaction of an epoxy resin with a polyol, polyether polyol, polyester polyol, polyamideamine, polycarboxylic acid, polyisocyanate compound or the like, or it may be a graft polymerization product of a lactone such as ε-caprolactone or an acryl monomer.

As examples of the aforementioned (1) mono- and polyamines there may be mentioned mono- or di-alkylamines such as monomethylamine, dimethylamine, monoethylamine, diethylamine, monoisopropylamine, diisopropylamine, monobutylamine and dibutylamine; alkanolamines such as monoethanolamine, diethanolamine, mono(2-hydroxypropyl)amine and monomethylaminoethanol, and alkylenepolyamines such as ethylenediamine, propylenediamine, butylenediamine, hexamethylenediamine, diethylenetriamine and triethylenetetramine.

As examples of the aforementioned (2) secondary mono- and polyamines with ketiminated primary amino groups there may be mentioned the aforementioned (1) primary and secondary mixed polyamines that have been ketiminated by reaction with ketone compounds such as diethylenetriamine.

As examples of the aforementioned (3) hydroxy compounds with ketiminated primary amino groups there may be mentioned, among the aforementioned (1) mono- and polyamines, compounds having primary amino groups and hydroxyl groups such as hydroxyl group-containing ketiminated compounds obtained by reacting ketone compounds with monoethanolamine and mono(2-hydroxypropyl)amine.

Particularly preferred as the cationic resin (A) is a xylene resin-modified amine-added epoxy resin obtained by reacting a phenolic hydroxyl group-containing xyleneformaldehyde and an amino group-containing compound with an epoxy resin with 180-2,500 and preferably 250-2,000 epoxy equivalents. The amino group-containing compound is preferably used in an amount of 5-25 mass % based on the total solid mass of the epoxy resin, xyleneformaldehyde and amino group-containing compound from the viewpoint of water-dispersibility and corrosion resistance.

The epoxy resin used as the starting material for production of the amino group-containing epoxy resin may be the same type of epoxy resin as described above for the cationic resin.

The xyleneformaldehyde resin is useful for internal plasticizing (modification) of the epoxy resin, and for example, it may be produced by condensation reaction of xylene with a formaldehyde and a phenol in the presence of an acidic catalyst.

Examples for the formaldehyde include formalin and paraformaldehyde, which are industrially available. As an alternative to direct addition of a formaldehyde, a compound that generates a formaldehyde such as trioxane may instead be used for synthesis of the resin.

The aforementioned phenols include monovalent and divalent phenolic compounds having 2 or 3 reaction sites, and as specific examples there may be mentioned phenol, cresol, para-octylphenol, nonylphenol, bisphenolpropane, bisphenolmethane, resorcin, pyrocatechol, hydroquinone, para-tert-butylphenol, bisphenolsulfone, bisphenol ether, para-phenylphenol and the like, with phenol and cresol being especially preferred. These may be used alone or in combinations of two or more.

The acidic catalyst used for condensation reaction of the xylene, formaldehyde and phenol may be, for example, sulfuric acid, hydrochloric acid, para-toluenesulfonic acid, oxalic acid or the like, and generally sulfuric acid is most preferred.

The condensation reaction may be carried out, for example, by heating to a temperature that causes reflux of the xylene, phenols, water and formalin in the reaction system, usually a temperature of about 80-100° C., and in most cases a period of about 2-6 hours will be necessary.

Heating of the xylene, formaldehyde and optionally the phenol under these conditions in the presence of an acidic catalyst for reaction can yield a xyleneformaldehyde resin.

The xyleneformaldehyde resin obtained in this manner may preferably have a viscosity in the range of 20-50,000 mPa·s, more preferably 25-30,000 mPa·s and even more preferably 30-15,000 mPa·s at 25° C., and preferably it has hydroxyl equivalents in the range of 100-50,000 g/eq, more preferably 150-30,000 g/eq and even more preferably 200-10,000 g/eq.

The amino group-containing compound is a cationizing component that introduces an amino group into the epoxy resin for cationization of the epoxy resin, and it may be the same type of amine used for production of the cationic resin.

The reactions for addition of the xyleneformaldehyde resin and the amino group-containing compound to the epoxy resin may be carried out in any desired order, but generally it is preferred to simultaneously conduct addition reaction of the xyleneformaldehyde resin and amino group-containing compound with the epoxy resin.

The addition reaction will usually be carried out in an appropriate solvent at a temperature of about 80-170° C. and preferably about 90-150° C. for about 1-6 hours and preferably about 1-5 hours. As examples of the solvent there may be mentioned hydrocarbon-based solvents such as toluene, xylene, cyclohexane and n-hexane; esteric solvents such as methyl acetate, ethyl acetate and butyl acetate; ketone-based solvents such as acetone, methyl ethyl ketone, methyl isobutyl ketone and methyl amyl ketone; amide-based solvents such as dimethylformamide and dimethylacetamide; alcohol-based solvents such as methanol, ethanol, n-propanol and isopropanol; and mixtures thereof.

The proportions of each of the reaction components used for the addition reaction are not strictly limited and may be adjusted as appropriate, but the following are suitable ranges based on the total solid mass of the three components, the epoxy resin, xyleneformaldehyde resin and amino group-containing compound.

Specifically, the epoxy resin is generally used in a range of 50-90 mass % and preferably 50-85 mass %; the xyleneformaldehyde resin is generally used in a range of 5-45 mass % and preferably 6-43 mass %; and the amino group-containing compound is generally used in a range of 5-25 mass % and preferably 6-20 mass %.

When the cationic resin has an amino group as the cationizable group, it may be neutralized with an organic carboxylic acid such as formic acid, acetic acid, propionic acid or lactic acid or an inorganic acid such as hydrochloric acid or sulfuric acid for solubilization or aqueous dispersion.

[Blocked Polyisocyanate (B)]

The cationic electrodeposition coating composition of the invention preferably comprises, as a crosslinking agent, a blocked polyisocyanate (B) obtained by reacting a polyisocyanate compound (b1) containing two or more isocyanate groups with castor oil (b2) and a blocking agent (b3), from the standpoint of throwing power, suitability for electrodeposition onto hot dip galvanized steel sheets, finished appearance and corrosion resistance.

[Polyisocyanate Compound (b1)]

The polyisocyanate compound (b1) used in the blocked polyisocyanate (B) may be any publicly known one, and as examples there may be mentioned aromatic, aliphatic and alicyclic polyisocyanate compounds including tolylene diisocyanate, xylylene diisocyanate, phenylene diisocyanate, diphenylmethane-2,4'-diisocyanate, diphenylmethane-4,4'-diisocyanate (commonly known as "MDI"), crude MDI ("polymethylenepolyphenyl isocyanate"), bis(isocyanatomethyl)cyclohexane, tetramethylene diisocyanate, hexamethylene diisocyanate, methylene diisocyanate, isophorone diisocyanate and the like, as well as ring-forming polymers of these polyisocyanate compounds, and isocyanate biuret compounds. These may be used alone or in combinations of two or more.

Particularly suited from the standpoint of corrosion resistance are aromatic polyisocyanate compounds such as tolylene diisocyanate, xylylene diisocyanate, phenylene diisocyanate, diphenylmethane-2,4'-diisocyanate, diphenylmethane-4,4'-diisocyanate and crude MDI.

[Castor Oil (b2)]

The castor oil (b2) used in the blocked polyisocyanate (B) is natural castor oil or synthetic castor oil. A suitable synthetic castor oil is "castor oil-based polyol".

Natural castor oil is a fatty acid triglyceride composed mainly of unsaturated hydroxy fatty acids, having a fatty acid composition of 85-95% ricinolic acid, 0.3-3.0% palmitic acid, 0.3-3.0% stearic acid, 1.0-7.0% oleic acid, 2.0-7.0% linolic acid, 0.5-5.0% linolenic acid and 0.3-10.0% of other components in terms of mass.

A "castor oil-based polyol" is the esterified product of ricinolic acid and a polyhydric alcohol (for example, glycerin, trimethylolpropane, pentaerythritol or the like).

As examples of commercially available castor oil-based polyols there may be mentioned URIC H-30, URIC H-52, URIC H-62, URIC H-81 and URIC H-92 (URIC series castor oil-based polyols, all trade names of Itoh Oil Chemicals Co., Ltd.)

The castor oil (b2) may be urethanated since the major portion (usually 87-91 mass %) of the fatty acid composition is ricinolic acid ($C_{18}H_{34}O_3$) containing OH groups. Furthermore, since the obtained blocked polyisocyanate (B) contains castor oil (b2), initial deposition of the electrodeposition coated film is hastened and it is possible to achieve satisfactory fused bonding of the coated film and adhesiveness onto articles to be coated.

Specifically, it is possible to apply the high voltage required to hasten deposition of the electrodeposition coated film and achieve satisfactory fused bonding of the coated film, thereby improving the throwing power. Moreover, the satisfactory fused bonding of the coated film and adhesiveness onto articles to be coated allow formation of a strong deposited film that can withstand sparks generated during electrodeposition of hot dip galvanized steel sheets, in order to obtain coated articles with excellent "suitability for electrodeposition of hot dip galvanized steel sheets" as well as satisfactory finished appearance and corrosion resistance.

[Blocking Agent (b3)]

The blocking agent (b3) preferably is one that blocks by addition to the isocyanate groups of the polyisocyanate compound, wherein the blocked polyisocyanate compound produced by the addition is stable at ordinary temperature but when heated to the baking temperature of the coated film (usually about 100-200° C.), allows the blocking agent to dissociate to regenerate the free isocyanate groups.

As examples of blocking agents (b3) there may be mentioned oxime-based compounds such as methylethylketooxime and cyclohexanoneoxime; phenol-based compounds such as phenol, para-t-butylphenol and cresol; aliphatic alcohols such as n-butanol and 2-ethylhexanol; aromatic alkyl alcohols such as phenylcarbinol and methylphenylcarbinol; ether alcohol-based compounds such as ethyleneglycolmonobutyl ether and diethylene glycol monoethyl ether; and lactam-based compounds such as ε-caprolactam and γ-butyrolactam.

Blocking agents with hydroxyl groups are preferred among these, and especially preferred are ether alcohol-based compounds represented by the following formula (1).

$$HO-(R^1O)_nR^2 \qquad \text{Formula (1)}$$

(wherein each $R^1$ of the n repeating units may be the same or different C2-4 linear or branched alkylene group, $R^2$ is a C1-15 and preferably C1-8 alkyl group, and n is an integer of 1-4.)

For production of the blocked polyisocyanate (B), it is preferred to first react the castor oil (b2) with the polyisocyanate compound (b1) and then react the blocking agent (b3) therewith, from the viewpoint of improving the throwing power of the cationic electrodeposition coating.

The mixing proportion of the castor oil (b2) and blocking agent (b3) to the polyisocyanate compound (b1) is most preferably as follows, from the viewpoint of throwing power and corrosion resistance of the obtained cationic electrodeposition coating:

the equivalent ratio of castor oil (b2) active hydrogen groups (hydroxyl groups)/polyisocyanate compound (b1) isocyanate groups is 0.02-0.5 and preferably 0.05-0.4, the equivalent ratio of blocking agent (b3) active hydrogen groups/polyisocyanate compound (b1) isocyanate groups is 0.5-1.2 and preferably 0.6-1.1, and the equivalent ratio of [castor oil (b2) active hydrogen groups+blocking agent (b3) active hydrogen groups]/polyisocyanate compound (b1) isocyanate groups] is 1.0-1.5 and preferably 1.0-1.3.

The aforementioned reaction also yields, as a by-product, blocked polyisocyanates having no castor oil (b2) added to the isocyanate groups of the polyisocyanate compound (b1) but rather having only two or more additions of the blocking agent (b3). This by-product is also included in the blocked polyisocyanate (B).

The cationic electrodeposition coating employing the blocked polyisocyanate (B) exhibits satisfactory throwing power, suitability for electrodeposition onto hot dip galvanized steel sheets, finished appearance and corrosion resistance.

The content of the castor oil (b2) in the blocked polyisocyanate (B) is preferably 2-50 mass %, more preferably 3-45 mass % and even more preferably 3-40 mass % based on the total mass of the polyisocyanate compound (b1), castor oil (b2) and blocking agent (b3), from the viewpoint of throwing power, finished appearance and corrosion resistance.

The mixing proportion of the cationic resin (A) and blocked polyisocyanate (B) in the cationic electrodeposition coating composition of the invention is usually preferred to be such that the cationic resin (A) is in the range of 50-95 mass % and especially 60-90 mass % and the blocked polyisocyanate (B) is in the range of 5-50 mass % and especially 10-40 mass % based on the total solid mass of both.

The cationic electrodeposition coating composition of the invention may also employ other blocked polyisocyanate compounds in addition to the blocked polyisocyanate (B), depending on the desired film performance.

The polyisocyanate compound and blocking agent used for other blocked polyisocyanate compounds may be the aforementioned polyisocyanate compound (b1) and blocking agent (b3).

The content of the castor oil (b2) in the composition of the invention, with respect to the total solid mass of the blocked polyisocyanate (B) and the other blocked polyisocyanate compound, is preferably 1-50 mass %, more preferably 2-45 mass % and even more preferably 2-40 mass % from the viewpoint of throwing power, finished appearance and corrosion resistance.

The cationic electrodeposition coating composition of the invention may also contain appropriate amounts of other additives such as curing catalysts, surfactants and surface control agents as well as organic solvents, and for example, curing catalysts are effective for promoting crosslinking reaction between the cationic resin (A) and the blocked polyisocyanate (B).

From the standpoint of both finished appearance and corrosion resistance, the cationic electrodeposition coating of the invention preferably also contains at least one alkyltin ester compound of an aromatic carboxylic acid, represented by the following formula (2) below, in an amount of 0-10 mass % and more preferably 0.01-5 mass % based on the total solid mass of the cationic resin (A) and blocked polyisocyanate (B).

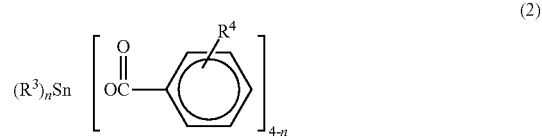

(wherein $R^3$ is an alkyl group with 1-12 carbon atoms, $R^4$ is hydrogen or an alkyl group with 1-4 carbon atoms and n is an integer of 1-3).

As examples of alkyltin ester compounds of aromatic carboxylic acids represented by formula (2) there may be mentioned dioctyltin dibenzoate and dibutyltin dibenzoate.

Production of a cationic electrodeposition coating composition is accomplished by thoroughly mixing of the cationic resin (A) and blocked polyisocyanate (B), and if desired other additives such as surfactants, surface control agents or alkyltin ester compounds of aromatic carboxylic acids, or an organic solvent, to prepare a blended resin, and then (usually) neutralizing the blended resin with a water-soluble organic carboxylic acid in an aqueous medium for solubilization or aqueous dispersion of the blended resin to obtain an emulsion. Neutralization of the blended resin can in most cases be achieved using a known acid, with preferred acids being acetic acid, formic acid, lactic acid or mixtures thereof.

As examples of surfactants there may be mentioned acetylene glycol-based, polyethylene glycol-based and polyhydric alcohol-based nonionic surfactants having an HLB in the range of 3-18 and preferably 5-15.

As examples of organic solvents there may be mentioned alcoholic solvents such as methyl alcohol, ethyl alcohol, n-butyl alcohol, isopropyl alcohol, 2-ethylhexanol, benzyl alcohol, ethylene glycol and propylene glycol; ether-based solvents such as ethylene glycol monoethyl ether, ethyleneglycolmonobutyl ether, ethyleneglycolmonohexyl ether, ethyleneglycolmono-2-ethylhexyl ether, diethyleneglycolmonobutyl ether, propylene glycol monomethyl ether, propyleneglycolmonophenyl ether, 3-methyl-3-methoxybutanol, diethylene glycol monoethyl ether and diethyleneglycolmonobutyl ether; ketone-based solvents such as acetone, methyl isobutyl ketone, cyclohexanone, isophorone and acetylacetone; ester-based solvents such as ethyleneglycol monoethyl ether acetate and ethyleneglycolmonobutyl ether acetate, and mixtures thereof.

The cationic electrodeposition coating composition is preferably produced by mixing an emulsion comprising a dispersion of the cationic resin (A) and blocked polyisocyanate (B), with a prepared pigment-dispersed paste.

The pigment-dispersed paste is obtained by pre-dispersing a color pigment, anti-corrosive pigment, extender pigment or the like into fine particles, and for example, it may be prepared by combining a pigment dispersion resin, neutralizer and pigment, as well as a bismuth compound if necessary, and subjecting the mixture to dispersing treatment in a dispersing mixer such as a ball mill, sand mill or pebble mill.

As pigment dispersion resins there may be used known resins such as base resins, surfactants and the like with hydroxyl and cationic groups. As dispersion resins there may be used tertiary amine-type, quaternary ammonium salt-type and tertiary sulfonium salt-type resins. The amount of pigment dispersion resin used is preferably in the range of 1-150 parts by mass and especially 10-100 parts by mass per 100 parts by mass of pigment.

There are no particular restrictions on the pigment, and for example, there may be added a color pigment such as titanium oxide, carbon black or iron oxide red; an extender pigment such as clay, mica, baryta, calcium carbonate or silica; or a anti-corrosive pigment such as aluminum phosphomolybdate, aluminum tripolyphosphate or zinc oxide (zinc flower).

A bismuth compound is also preferably added for the purpose of preventing corrosion or preventing rust. As bismuth compounds there may be used, for example, bismuth oxide, bismuth hydroxide, basic bismuth carbonate, bismuth nitrate, bismuth silicate and bismuth salt of organic acid.

For improved curability, an organic tin compound such as dioctyltin oxide or dibutyltin oxide may also be used. However, the curability can also be improved without adding such organic tin compounds, if a anti-corrosive pigment such as zinc oxide (zinc flower) and/or a bismuth compound is used and extended or micronized (nanoized).

The total amount of the pigment component and the bismuth compound and/or organic tin compound added is preferably in the range of 1-100 mass % and especially 10-50 mass % based on the total solid mass of the base resin and curing agent. The article to be coated with the cationic electrodeposition coating composition of the invention is not particularly restricted so long as it is metal, and there may be mentioned automobile bodies, two-wheeled vehicle parts, home appliances and other devices.

The metal steel sheet used as an article to be coated may be a cold-rolled steel sheet, hot dip galvanized steel sheet, electro-galvanized steel sheet, electrolytic zinc-iron electroplated steel sheet, organic composite plated steel sheet, Al material, Mg material, or any such metal steel sheet that, as necessary, has been subjected to surface cleaning by alkali degreasing and then additional surface treatment such as phosphate chemical conversion treatment or chromate treatment.

The cationic electrodeposition coating composition of the invention may be used to coat the surface of the desired substrate surface by electrodeposition. Electrodeposition is generally carried out by preparing an electrodeposition bath containing the electrodeposition coating composition diluted with deionized water to a solid concentration in the range of about 5-40 mass % and adjusted to a pH in the range of 5.5-9.0, and electrification using the article to be coated as the cathode, normally under conditions with a bath temperature of 15-35° C. and a load voltage of 100-400V. For most purposes, the electrodeposition is followed by thorough rinsing with an ultrafiltration solution (UF solution), reverse osmosis water (RO water), industrial water, purified water or the like, for removal of the excess adhering cationic electrodeposition coating.

The film thickness of the electrodeposition coated film is not particularly restricted, but in most cases it may be in the range of 5-40 µm and preferably 12-30 µm as a dry coated film.

Bake drying of the coated film can be carried out using drying equipment such as an electric hot air drier, gas hot air drier or the like, for heating of the electrodeposition coated film at a coated article surface temperature of 110° C.-200° C. and preferably 140-180° C. for 10-180 minutes and preferably 20-50 minutes. The coated film can be cured by the bake drying described above.

The cationic electrodeposition coating composition of the invention can form a cured coating film with excellent throwing power, suitability for electrodeposition onto hot dip galvanized steel sheets, finished appearance and corrosion resistance, and it is useful as a coating composition for automobile bodies, automobile parts, household electrical appliances, construction materials, steel structures and the like.

The present invention will now be explained in greater detail by examples, with the understanding that the invention is in no way limited by the examples. The "parts" and "%" values are "parts by mass" and "mass %", respectively.

PRODUCTION EXAMPLE 1

Production of Curing Agent No. 1

In a reactor there were added 270 parts of COSMONATE M-200 (crude MDI, isocyanate value: 311 mgNCO/g, trade name of Mitsui Chemicals, Inc.) and 155 parts of methyl isobutyl ketone, and the mixture was heated to 70° C. To this mixture there was added 160 parts of URIC H-30 (castor oil-based polyol, hydroxyl value: 160 mgKOH/g, trade name of Itoh Oil Chemicals Co., Ltd.), and reaction was conducted to an isocyanate value of 155 mgNCO/g.

Next, 190 parts of ethyleneglycol monobutyl ether (hydroxyl value: 475 mgKOH/g) was added dropwise over a period of 1 hour prior to heating to 100° C., and the mixture was periodically sampled while maintaining that temperature until absorption of the unreacted isocyanate groups at 2270 $cm^{-1}$ was confirmed to have ceased by infrared absorption spectroscopy, in order to obtain curing agent No. 1 with a solid content of 80%.

With curing agent No. 1, the equivalent ratio of castor oil (b2) active hydrogen groups/polyisocyanate compound (b1) isocyanate groups was 0.23, the equivalent ratio of blocking agent (b3) active hydrogen groups/polyisocyanate compound (b1) isocyanate groups was 0.81, and the equivalent ratio of [castor oil (b2) active hydrogen groups+blocking agent (b3) active hydrogen groups]/[polyisocyanate compound (b1) isocyanate groups] was 1.03. The proportion of castor oil (b2) was 26 mass % based on the total mass of the polyisocyanate compound (b1), castor oil (b2) and blocking agent (b3).

PRODUCTION EXAMPLE 2

Production of Curing Agent No. 2

In a reactor there were added 222 parts of isophorone diisocyanate (isocyanate value: 378 mgNCO/g) and 120 parts of methyl isobutyl ketone, and the mixture was heated to 70°

C. To this mixture there was added 160 parts of URIC H-62 (castor oil-based polyol, hydroxyl value: 260 mgKOH/g, trade name of Itoh Oil Chemicals Co., Ltd.), and reaction was conducted to an isocyanate value of 145 mgNCO/g.

Next, 115 parts of methylethylketoxime (hydroxyl value: 645 mgKOH/g) was added dropwise over a period of 1 hour prior to heating to 80° C., and the mixture was periodically sampled while maintaining that temperature until absorption of the unreacted isocyanate groups was confirmed to have ceased by infrared absorption spectroscopy, in order to obtain curing agent No. 2 with a solid content of 80%.

With curing agent No. 2, the equivalent ratio of castor oil (b2) active hydrogen groups/polyisocyanate compound (b1) isocyanate groups was 0.37, the equivalent ratio of blocking agent (b3) active hydrogen groups/polyisocyanate compound (b1) isocyanate groups was 0.66, and the equivalent ratio of [castor oil (b2) active hydrogen groups+blocking agent (b3) active hydrogen groups]/[polyisocyanate compound (b1) isocyanate groups] was 1.03. The proportion of castor oil (b2) was 33 mass % based on the total mass of (b1)-(b3).

PRODUCTION EXAMPLE 3

Production of Curing Agent No. 3

In a reactor there were added 270 parts of COSMONATE M-200 (crude MDI, isocyanate value: 311 mgNCO/g, trade name of Mitsui Chemicals, Inc.) and 123 parts of methyl isobutyl ketone, and the mixture was heated to 70° C. To this mixture there was added 12 parts of URIC H-52 (castor oil-based polyol, hydroxyl value: 200 mgKOH/g, trade name of Itoh Oil Chemicals Co., Ltd.), and reaction was conducted to an isocyanate value of 292 mgNCO/g.

Next, 236 parts of ethyleneglycol monobutyl ether (hydroxyl value: 475 mgKOH/g) was added dropwise over a period of 1 hour prior to heating to 100° C., and the mixture was periodically sampled while maintaining that temperature until absorption of the unreacted isocyanate groups at 2270 $cm^{-1}$ was confirmed to have ceased by infrared absorption spectroscopy, in order to obtain curing agent No. 3 with a solid content of 80%.

With curing agent No. 3, the equivalent ratio of castor oil (b2) active hydrogen groups/polyisocyanate compound (b1) isocyanate groups was 0.02, the equivalent ratio of blocking agent (b3) active hydrogen groups/polyisocyanate compound (b1) isocyanate groups was 1.0, and the equivalent ratio of [castor oil (b2) active hydrogen groups+blocking agent (b3) active hydrogen groups]/[polyisocyanate compound (b1) isocyanate groups] was 1.02. The proportion of castor oil (b2) was 2 mass % based on the total mass of (b1)-(b3).

PRODUCTION EXAMPLE 4

Production of Curing Agent No. 4

In a reactor there were added 270 parts of COSMONATE M-200 (crude MDI, isocyanate value: 311 mgNCO/g, trade name of Mitsui Chemicals, Inc.) and 161 parts of methyl isobutyl ketone, and the mixture was heated to 70° C. After then adding 350 parts of the purified castor oil kou-No. 1 (purified castor oil, hydroxyl value: 160 mgKOH/g, trade name of Itoh Oil Chemicals Co., Ltd.), reaction was conducted until the isocyanate value reached 75 mgNCO/g.

Next, 142 parts of ethyleneglycol monobutyl ether (hydroxyl value: 475 mgKOH/g) was added dropwise over a period of 1 hour prior to heating to 100° C., and the mixture was periodically sampled while maintaining that temperature until absorption of the unreacted isocyanate groups at 2270 $cm^{-1}$ was confirmed to have ceased by infrared absorption spectroscopy, in order to obtain curing agent No. 4 with a solid content of 80%.

With curing agent No. 4, the equivalent ratio of castor oil (b2) active hydrogen groups/polyisocyanate compound (b1) isocyanate groups was 0.5, the equivalent ratio of blocking agent (b3) active hydrogen groups/polyisocyanate compound (b1) isocyanate groups was 0.6, and the equivalent ratio of [castor oil (b2) active hydrogen groups+blocking agent (b3) active hydrogen groups]/[polyisocyanate compound (b1) isocyanate groups] was 1.1. The proportion of castor oil (b2) was 47 mass % based on the total mass of (b1)-(b3).

PRODUCTION EXAMPLE 5

Production of Curing Agent No. 5

In a reactor there were added 270 parts of COSMONATE M-200 (crude MDI, trade name of Mitsui Chemicals, Inc.) and 130 parts of methyl isobutyl ketone, and the mixture was heated to 70° C. After then adding 240 parts of ethyleneglycol monobutyl ether dropwise over a period of 1 hour, the temperature was raised to 100° C., and the mixture was periodically sampled while maintaining that temperature until absorption of the unreacted isocyanate groups was confirmed to have ceased by infrared absorption spectroscopy, in order to obtain curing agent No. 5 with a solid content of 80%.

PRODUCTION EXAMPLE 6

Production of Curing Agent No. 6

In a reactor there were added 222 parts of isophorone diisocyanate and 100 parts of methyl isobutyl ketone, and the mixture was heated to 50° C. After slowly adding 174 parts of methylethylketoxime, the temperature was raised to 60° C. The mixture was periodically sampled while maintaining that temperature until absorption of the unreacted isocyanate groups was confirmed to have ceased by infrared absorption spectroscopy, in order to obtain curing agent No. 6 with a solid content of 80%.

PRODUCTION EXAMPLE 7

Production of Base Resin No. 1 Solution

In a 2 liter volume separable flask equipped with a thermometer, reflux condenser and stirrer, 390 g of bisphenol A and 0.2 g of dimethylbenzylamine were added to 1010 g of EPICOAT 828EL (epoxy resin, trade name of Japan Epoxy Resins Co., Ltd.), and reaction was continued until reaching 800 epoxy equivalents at 130° C.

Next, 160 g of diethanolamine and 65 g of ketiminated diethylenetriamine were added and reaction was conducted at 120° C. for 4 hours, after which 355 g of ethyleneglycol monobutyl ether was added to obtain a solution of base resin No. 1 with a resin solid content of 80 mass %. The base resin No. 1 had an amine value of 67 and a number-average molecular weight of 2,000.

PRODUCTION EXAMPLE 8

Production of Base Resin No. 2 Solution

In the same type of separable flask used in Production Example 7 there were charged 480 parts of 50% formalin, 110 parts of phenol, 202 parts of 98% industrial sulfuric acid and 424 parts of m-xylene, and reaction was conducted at 84-88° C. for 4 hours.

Upon completion of the reaction, the mixture was allowed to stand for separation of the sulfuric acid aqueous phase and the xylene solution dissolving the resin phase, and then the resin phase was rinsed three times. The unreacted m-xylene was distilled off for 20 minutes under conditions of 20-30 mmHg/120-130° C. to obtain 480 parts of a phenol-modified xyleneformaldehyde resin with viscosity of 1050 mPa·s (25° C.).

Production of Emulsions

PRODUCTION EXAMPLE 9

Production of Emulsion No. 1

After combining 87.5 parts of base resin No. 1 obtained in Production Example 7 (solid content: 70 parts) and 37.5 parts of curing agent No. 1 obtained in Production Example 1 (solid content: 30 parts), 11 parts of 10% formic acid was further added and the mixture was stirred to uniformity, after which 158 parts of deionized water was added dropwise over a period of about 15 minutes while forcefully stirring, to obtain emulsion No. 1.

PRODUCTION EXAMPLE 10-20

Production of Emulsions No. 2-No. 12

Emulsions No. 2-No. 12 were obtained in the same manner as Production Example 9, except for using the contents listed in Table 1.

TABLE 1

| | | Prod. Ex. 9 | Prod. Ex. 10 | Prod. Ex. 11 | Prod. Ex. 12 | Prod. Ex. 13 | Prod. Ex. 14 | Prod. Ex. 15 | Prod. Ex. 16 | Prod. Ex. 17 | Prod. Ex. 18 | Prod. Ex. 19 | Prod. Ex. 20 |
|---|---|---|---|---|---|---|---|---|---|---|---|---|---|
| | | | | | | | Emulsion | | | | | | |
| | | No. 1 | No. 2 | No. 3 | No. 4 | No. 5 | No. 6 | No. 7 | No. 8 | No. 9 | No. 10 | No. 11 | No. 12 |
| Composition | Base resin No. 1 | 87.5 (70) | 87.5 (70) | 87.5 (70) | | | | 87.5 (70) | 87.5 (70) | 87.5 (70) | 87.5 (70) | | |
| | Base resin No. 2 | | | | 87.5 (70) | 87.5 (70) | 87.5 (70) | | | | | 87.5 (70) | 87.5 (70) |
| | Curing agent No. 1 | 37.5 (30) | | 37.5 (30) | 37.5 (30) | 25 (20) | 37.5 (30) | | | | | | |
| | Curing agent No. 2 | | 37.5 (30) | | | | | | | | | | |
| | Curing agent No. 3 | | | | | | | 37.5 (30) | | | | | |
| | Curing agent No. 4 | | | | | | | | 37.5 (30) | | | | |
| | Curing agent No. 5 | | | | | | | | | 37.5 (30) | | 37.5 (30) | |
| | Curing agent No. 6 | | | | | 12.5 (10) | | | | | 37.5 (30) | | 37.5 (30) |
| | Dibutyltin dibenzoate | | | 2.5 (1) | | | 2.5 (1) | | | | | | |
| | 10% acetic acid | 13 | 13 | 13 | 13 | 13 | 13 | 13 | 13 | 13 | 13 | 13 | 13 |
| | Deionized water | 156 | 156 | 156.5 | 156 | 156 | 156.5 | 156 | 156 | 156 | 156 | 156 | 156 |
| Emulsion | | 294 (100) | 294 (100) | 297 (101) | 294 (100) | 294 (100) | 297 (101) | 294 (100) | 294 (100) | 294 (100) | 294 (100) | 294 (100) | 294 (100) |

Numerals represent contents, with solid portions in parentheses.

To a separate flask there were added 1000 parts of EPICOAT 828EL (epoxy resin, epoxy equivalents: 190, molecular weight: 350, trade name of Japan Epoxy Resins Co., Ltd.), 400 parts of bisphenol A and 0.2 part of dimethylbenzylamine, and reaction was conducted until reaching 750 epoxy equivalents at 130° C.

Next, 300 parts of a xyleneformaldehyde resin, 137 parts of diethanolamine and 95 parts of ketiminated diethylenetriamine were added and reaction was conducted at 120° C. for 4 hours. This was followed by addition of 403 parts of methyl isobutyl ketone to obtain a solution of base resin No. 2 with a resin solid content of 80 mass %, as a xyleneformaldehyde resin-modified amino group-containing epoxy resin. Base resin No. 2 had an amine value of 57 mgKOH/g and a number-average molecular weight of 2,000.

PRODUCTION EXAMPLE 21

Production of Pigment Dispersion Resin

To 1010 parts of EPICOAT 828EL (epoxy resin, trade name of Japan Epoxy Resins Co., Ltd.) there were added 390 parts of bisphenol A, 240 parts of PLACCEL 212 (polycaprolactonediol, weight-average molecular weight: approximately 1,250, trade name of Daicel Chemical Industries, Ltd.) and 0.2 part of dimethylbenzylamine, and reaction was conducted until reaching about 1090 epoxy equivalents at 130° C.

After then adding to the system 134 parts of dimethylethanolamine and 150 parts of a 90% lactic acid aqueous solution, reaction was continued at 120° C. for 4 hours. Next, methyl isobutyl ketone was added to adjust the solid content and obtain a pigment dispersion resin in an ammonium salt-type resin system with a solid content of 60%. The pigment dispersion resin in the ammonium salt-type resin system had an ammonium salt concentration of 0.78 mmol/g.

PRODUCTION EXAMPLE 22

Production of Pigment-Dispersed Paste No. 1

After adding 8.3 parts of the pigment dispersion resin with a solid content of 60% obtained in Production Example 21 (solid content: 5 parts), 14.5 parts of titanium oxide, 7.0 parts of purified clay, 0.3 part of carbon black, 1 part of dioctyltin oxide, 1 part of bismuth hydroxide and 20.3 parts of deionized water, the mixture was dispersed for 20 hours using a ball mill to obtain pigment-dispersed paste No. 1 with a solid content of 55%.

PRODUCTION EXAMPLE 23

Production of Pigment-Dispersed Paste No. 2

Pigment-dispersed paste No. 2 with a solid content of 55% was obtained in the same manner as Production Example 22, except that the 1 part of dioctyltin oxide was changed to 3.0 parts of zinc oxide.

Production of Cationic Electrodeposition Coatings

Example 1

There were blended 294 parts of the cationic electrodeposition emulsion No. 1 (solid content: 100 parts), 52.4 parts of the 55% pigment-dispersed paste No. 1 (solid content: 28.8 parts) and 297.6 parts of deionized water to produce cationic electrodeposition coating No. 1 with a solid content of 20%.

Examples 2-9

Cationic electrodeposition coatings No. 2-No. 9 were produced in the same manner as Example 1, with the contents listed in Table 2.

Comparative Examples 1-4

Cationic electrodeposition coatings No. 10-No. 13 were produced in the same manner as Example 1, with the contents listed in Table 2.

TABLE 2

| | | Example 1 | Example 2 | Example 3 | Example 4 | Example 5 | Example 6 | Example 7 |
|---|---|---|---|---|---|---|---|---|
| | | Cationic electrodeposition coating | | | | | | |
| | | No. 1 | No. 2 | No. 3 | No. 4 | No. 5 | No. 6 | No. 7 |
| Composition | Emulsion No. 1 | 294 (100) | | | | | | |
| | Emulsion No. 2 | | 294 (100) | | | | | |
| | Emulsion No. 3 | | | 297 (101) | | | | |
| | Emulsion No. 4 | | | | 294 (100) | | | |
| | Emulsion No. 5 | | | | | 294 (100) | | |
| | Emulsion No. 6 | | | | | | 297 (101) | |
| | Emulsion No. 7 | | | | | | | 294 (100) |
| | Emulsion No. 8 | | | | | | | |
| | Emulsion No. 9 | | | | | | | |
| | Emulsion No. 10 | | | | | | | |
| | Emulsion No. 11 | | | | | | | |
| | Emulsion No. 12 | | | | | | | |
| | Pigment-dispersed paste No. 1 | 52.4 (28.8) | 52.4 (28.8) | 52.4 (28.8) | 52.4 (28.8) | 52.4 (28.8) | 52.4 (28.8) | 52.4 (28.8) |
| | Pigment-dispersed paste No. 2 | | | | | | | |

TABLE 2-continued

| Deionized water | 297.6 | 297.6 | 299.6 | 297.6 | 297.6 | 299.6 | 297.6 |
|---|---|---|---|---|---|---|---|
| Cationic electro-deposition coating (20% solid content) | 644 (128.8) | 644 (128.8) | 649 (129.8) | 644 (128.8) | 644 (128.8) | 649 (129.8) | 644 (128.8) |

| | | | Example 8 | Example 9 | Comp. Ex. 1 | Comp. Ex. 2 | Comp. Ex. 3 | Comp. Ex. 4 |
|---|---|---|---|---|---|---|---|---|
| | | | \multicolumn{6}{c}{Cationic electrodeposition coating} |
| | | | No. 8 | No. 9 | No. 10 | No. 11 | No. 12 | No. 13 |
| Composition | Emulsion No. 1 | | | 294 (100) | | | | |
| | Emulsion No. 2 | | | | | | | |
| | Emulsion No. 3 | | | | | | | |
| | Emulsion No. 4 | | | | | | | |
| | Emulsion No. 5 | | | | | | | |
| | Emulsion No. 6 | | | | | | | |
| | Emulsion No. 7 | | | | | | | |
| | Emulsion No. 8 | | 294 (100) | | | | | |
| | Emulsion No. 9 | | | | 294 (100) | | | |
| | Emulsion No. 10 | | | | | 294 (100) | | |
| | Emulsion No. 11 | | | | | | 294 (100) | |
| | Emulsion No. 12 | | | | | | | 294 (100) |
| | Pigment-dispersed paste No. 1 | | 52.4 (28.8) | | 52.4 (28.8) | 52.4 (28.8) | 52.4 (28.8) | 52.4 (28.8) |
| | Pigment-dispersed paste No. 2 | | | 52.4 (28.8) | | | | |
| Deionized water | | | 297.6 | 350 | 297.6 | 297.6 | 297.6 | 297.6 |
| Cationic electro-deposition coating (20% solid content) | | | 644 (128.8) | 644 (128.8) | 644 (128.8) | 644 (128.8) | 644 (128.8) | 644 (128.8) |

Numerals represent contents, with solid portions in parentheses.

Fabrication of Test Sheet

Each of the cationic electrodeposition coatings obtained in the examples and comparative examples was used for electrodeposition using a cold-rolled steel sheet (0.8 mm×150 mm×70 mm) that had been subjected to chemical conversion treatment (PALBOND #3020 (zinc phosphate treatment agent, trade name of Nihon Parkerizing Co., Ltd.)), or an hot dip galvanized steel sheet (0.8 mm×150 mm×70 mm) subjected to the same chemical conversion treatment as the article to be coated, in order to fabricate a test sheet.

Each of the obtained test sheets was used for a test according to the method described below, yielding the results shown in Table 3 and Table 4.

TABLE 3

| | | | Example 1 | Example 2 | Example 3 | Example 4 | Example 5 | Example 6 | Example 7 | Example 8 | Example 9 |
|---|---|---|---|---|---|---|---|---|---|---|---|
| | | | \multicolumn{9}{c}{Cationic electrodeposition coating} |
| | | | No. 1 | No. 2 | No. 3 | No. 4 | No. 5 | No. 6 | No. 7 | No. 8 | No. 9 |
| Test results | Throwing power | G side (μm) | 9 | 10 | 9 | 10 | 10 | 10 | 10 | 9 | 9 |
| | | A side (μm) | 15 | 15 | 15 | 15 | 15 | 15 | 15 | 15 | 15 |
| | | % | 60 | 67 | 60 | 67 | 67 | 67 | 67 | 60 | 60 |
| | Suitability for electrodeposition onto hot dip galvanized steel sheets | | G | G | VG | G | G | VG | G | G | G |
| | Finished appearance | | G | G | VG | G | G | VG | G | G | G |
| | Corrosion resistance | | G | G | VG | VG | VG | VG | VG | G | G |
| | Weather resistance | | G | G | G | G | G | VG | G | G | G |

TABLE 4

|  |  |  | Comp. Ex. 1 | Comp. Ex. 2 | Comp. Ex. 3 | Comp. Ex. 4 |
|---|---|---|---|---|---|---|
|  |  |  | Cationic electrodeposition coating | | | |
|  |  |  | No. 10 | No. 11 | No. 12 | No. 13 |
| Test results | Throwing power | G side (μm) | 7 | 7 | 6 | 8 |
|  |  | A side (μm) | 15 | 15 | 15 | 15 |
|  |  | % | 47 | 47 | 33 | 53 |
|  | Suitability for electrodeposition onto hot dip galvanized steel sheets |  | F | F | F | F |
|  | Finished appearance |  | F | F | F | F |
|  | Corrosion resistance |  | F | G | F | G |
|  | Weather resistance |  | F | F | F | F |

Figure 2:
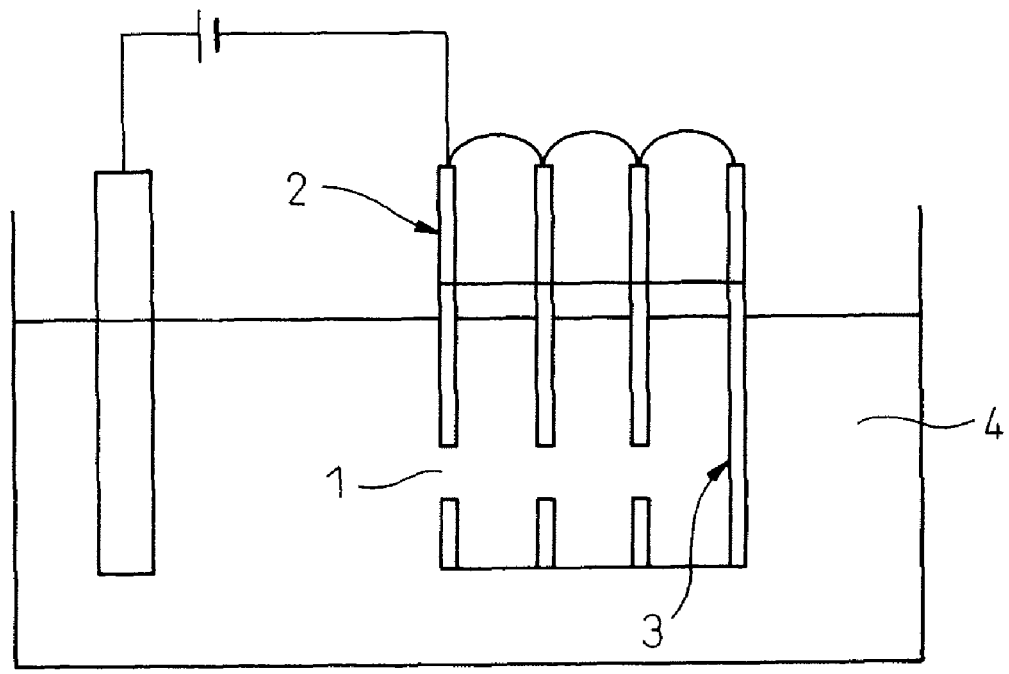
FIG. 2 is an illustration of electrodeposition in the throwing power test.

Throwing Power:

A "four sheets box throwing power test jig" (see FIG. 1) having 8 mm-diameter holes and four steel sheets arranged at 2 cm spacings was wired as shown in FIG. 2. Of the four steel sheets in FIG. 2, the left facing side, toward the leftmost steel sheet, was designated as the "A-surface", while the right facing side was designated as the "B-surface". Similarly, the left and right sides of the second steel sheet from the left were designated as the "C-surface" and "D-surface", respectively, the left and right sides of the third steel sheet from the left were designated as the "E-surface" and "F-surface", respectively, and the left and right sides of the rightmost steel sheet were designated as the "G-surface" and "H-surface", respectively. The A-surface corresponds to the "outer sheet" while the G-surface corresponds to the "inner sheet".

Using the apparatus shown in FIG. 2, electrodeposition was performed with a coating bath temperature of 30° C., a distance of 10 cm between the A-surface and electrode, an electrification time of 3 minutes, and a voltage for an outer sheet cured film thickness of 15 μm. The throwing power was evaluated based on the outer sheet cured film thickness, inner sheet cured film thickness and throwing power (%) (=inner sheet cured film thickness/outer sheet cured film thickness× 100).

Suitability for Electrodeposition on Hot Dip Galvanized Steel Sheets:

A 0.8×150×70 mm hot dip galvanized steel sheet that had been subjected to chemical conversion treatment with PAL-BOND #3020 (zinc phosphate treatment agent, trade name of Nihon Parkerizing Co., Ltd.) was immersed as the cathode in an electrodeposition coating bath, and electrodeposition was performed at the same electrification voltage as in the throwing power test. The obtained coated film was subjected to bake curing at 170° C. for 20 minutes, and the number of pinholes in the baked test piece (test surface: 150 mm×70 mm) were counted.

The following evaluation scale was used:
Very good (VG): No pinholes,
Good (G): One small pinhole (cratering), but concealable with intercoat coated film,
Fair (F): 2-9 pinholes,
Poor (P): 10 or more pinholes.

Finished Appearance:

Coating was performed under the same conditions as for the suitability for electrodeposition, to obtain a coated sheet with a cured film thickness of 15 μm. The surface roughness of the coated sheet was evaluated using a SURFTEST 301 (surface roughness meter, trade name of Mitsutoyo Corp.) according to JIS B 0651, as the center line average roughness (Ra) value.

The following evaluation scale was used:
Very good (VG): Ra value of less than 0.23 μm,
Good (G): Ra value of at least 0.23 and less than 0.30
Fair (F): Ra value of at least 0.30 and less than 0.40
Poor (P): Ra value of at least 0.40 μm.

Corrosion Resistance:

Coating was performed under the same conditions as in the test for suitability for electrodeposition, to obtain a test sheet with a cured film thickness of 20 μm.

The coated film of the test sheet was then crosscut with a cutter knife to the base (steel section) of the test sheet and subjected to a 35° C. salt spray test for 840 hours according to JIS Z-2371, and the width of rust or blistering from the cut sections was evaluated.

The evaluation scale, based on the maximum width of rust or blistering, was as follows:
Very good (VG): no greater than 2.0 mm on one side from the cut section,
Good (G): more than 2.0 mm but no greater than 3.0 mm on one side from the cut section,
Fair (F): more than 3.0 mm but no greater than 3.5 mm on one side from the cut section,
Poor (P): more than 3.5 mm on one side from the cut section.

Weather Resistance:

A test sheet prepared under the same conditions as in the test for corrosion resistance was spray coated with WP-300 (aqueous intermediate coat, product of Kansai Paint Co., Ltd.) to a cured film thickness of 25 μm, and then baked at 140° C.×30 minutes in an electric hot air dryer.

The intermediate coated film was then spray coated with NEOAMYLAC 6000 (top coat, product of Kansai Paint Co., Ltd.) to a cured film thickness of 35 μm and baked at 140° C.×30 minutes with an electric hot air dryer to prepare a weather exposure test sheet.

The coated film of the weather exposure test sheet was crosscut with a knife to the base (steel section) and laid in a horizontal position for exposure to the weather for one year in Chikura, Chiba Prefecture (coastal area), after which the rust and blistering width from the knife notches were evaluated as follows.

The evaluation scale, based on the maximum width of rust or blistering, was as follows:
Very good (VG): less than 2 mm on one side from the cut section,
Good (G): at least 2 mm and less than 3 mm on one side from the cut section,
Fair (F): at least 3 mm and less than 4 mm on one side from the cut section,
Poor (P): at least 4 mm on one side from the cut section.

The present invention is industrially useful since it can provide coated articles with excellent throwing power, suitability for electrodeposition onto hot dip galvanized steel sheets, finished appearance and corrosion resistance.

What we claim is:

1. A cationic electrodeposition coating composition comprising a cationic resin (A) and a blocked polyisocyanate (B) obtained by reaction between a polyisocyanate compound (b1) with two or more isocyanate groups, castor oil (b2) and a blocking agent (b3),
   wherein the blocked polyisocyanate (B) is obtained by reaction between the polyisocyanate compound (b1), castor oil (b2) and blocking agent (b3) at 0.02-0.5 as the equivalent ratio of the castor oil (b2) active hydrogen groups/polyisocyanate compound (b1) isocyanate groups, 0.5-1.2 as the equivalent ratio of blocking agent (b3) active hydrogen groups/polyisocyanate compound (b1) isocyanate groups, and 1.0-1.5 as the equivalent ratio of [castor oil (b2) active hydrogen groups+blocking agent (b3) active hydrogen groups]/[polyisocyanate compound (b1) isocyanate groups].

2. The cationic electrodeposition coating composition according to claim 1, wherein the proportion of castor oil (b2) is 2-50 mass % based on the total mass of the polyisocyanate compound (b1), castor oil (b2) and blocking agent (b3).

3. The cationic electrodeposition coating composition according to claim 1, wherein the castor oil (b2) is the ester product of ricinolic acid and a polyhydric alcohol.

4. The cationic electrodeposition coating composition according to claim 1, wherein the polyisocyanate compound (b1) is an aromatic polyisocyanate compound.

5. The cationic electrodeposition coating composition according to claim 1, wherein the blocking agent (b3) is represented by the following formula (1):

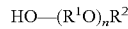 Formula (1)

wherein in Formula (1), each $R^1$ of the n repeating units is the same or different C2-4 linear or branched alkylene group, $R^2$ is a C1-15 alkyl group, and n is an integer of 1-4.

6. The cationic electrodeposition coating composition according to claim 1, wherein the cationic resin (A) is a xylene resin-modified amine-added epoxy resin obtained by reacting a phenolic hydroxyl group-containing xyleneformaldehyde resin and an amino group-containing compound with an epoxy resin having 180-2500 epoxy equivalents, and the amino group-containing compound is used in the reaction in a proportion of 5-25 mass % based on the total mass of the epoxy resin, xyleneformaldehyde resin and amino group-containing compound.

\* \* \* \* \*